Figure 1:
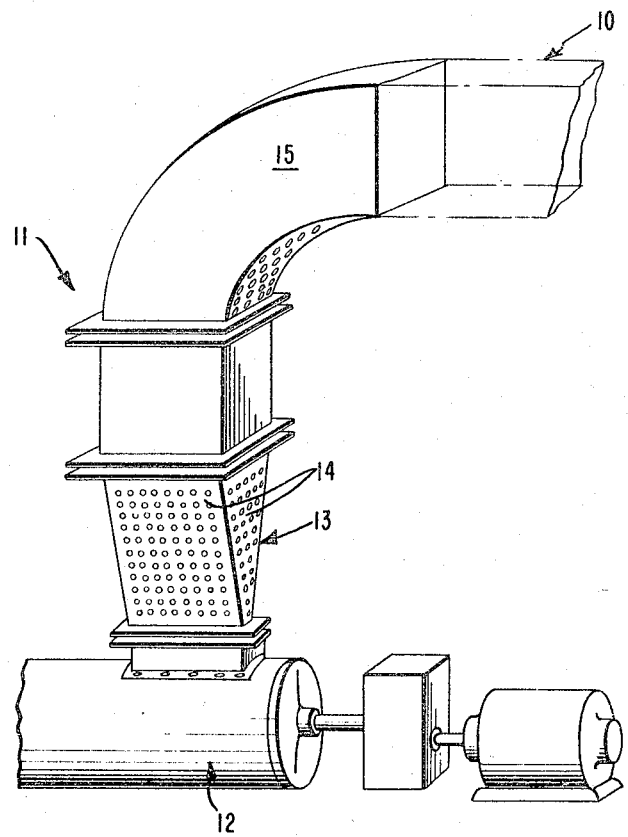

March 21, 1967 A. G. TILLEY ET AL 3,310,349
ARTICLE AND APPARATUS FOR CONVEYING PARTICULATE
MATTER PNEUMATICALLY
Filed Oct. 26, 1964

INVENTORS
ALTON GREY TILLEY
ROBERT MILTON WALL

BY *Robert W Black*

ATTORNEY

United States Patent Office 3,310,349
Patented Mar. 21, 1967

3,310,349
ARTICLE AND APPARATUS FOR CONVEYING PARTICULATE MATTER PNEUMATICALLY
Alton Grey Tilley and Robert Milton Wall, Florence, S.C., assignors to E. I. du Pont de Nemours and Company, Wilmington, Del., a corporation of Delaware
Filed Oct. 26, 1964, Ser. No. 406,283
4 Claims. (Cl. 302—59)

This invention relates to pneumatic conveyors and more particularly to vented, tapered pneumatic conveyors.

Pneumatic conveyors are most useful for handling low density, particulate materials, especially softer materials which do not abrade conveyor ducts, and materials which are not, or do not become tacky in handling. For such conveying there is an optimum quantity of air for a given quantity of solids, and an optimum air velocity. These parameters depend upon many conditions, such as distance to be transported, duct configuration, the density of the materials, etc. The coupling of a conveyor to a feeder of process machinery generally must be provided with a means to separate the conveying air from the solids, to minimize plugging at the exit from the feeder caused by back pressure of the air, and to minimize the flow of air into the process. For the most part, centrifugal separators are satisfactory for higher density, finely divided materials; however, large cross-section, lower density materials such as film scrap or other non-metallic sheet scraps are not especially suited to the centrifugal or cyclone-type separators. Even if these materials are separated from the conveying air stream, they still present a problem in that they tend to plug in the separator.

The problem, which necessitated the present invention is basically one of separating conveying air from entrained solids. This is especially true of thin sheet materials, such as edge trim from organic polymer films which is often recycled. In centrifugal separators of the "cyclone" type, difficulties inherent in the low density, high cross-section configuration of the thin strips and scraps results in poor efficiency in separation from the air stream, the accumulation of solids in peripheral areas, with ultimate plugging of the stream. Further, if the bulk of the conveying air is allowed to pass into the processing machinery, for example, a screw feeder or a disintegrator, it can cause plugging by covering over exit screens, and can also carry an excessive quantity of fines through from the disintegrator to contaminate the atmosphere and adjacent areas.

It is not immediately apparent that any of the conveying air could be vented in the feeder without reducing the velocity and aggravating the plugging problem. In practice it is found that if a small number of holes are drilled in the tapered duct that these soon become blocked, or have no net effect. On the other hand, if a very large number of holes are drilled in the duct, i.e., it is made fully of perforated sheet stock having the area of the holes well over one half the total area, then the conveying velocity falls to a level in which the exit from the tapered feeder becomes plugged.

In the present invention it is found that if the area of the vents in any portion of the wall of the duct is substantially equal to the reduction in cross-sectional area, then the exit velocity of the air from the vents is low, and the tendency of entrained solids to block these vents is substantially non-existent. It is not readily apparent why blocking of the vents does not occur, but it is hypothesized that with a number of vents larger than the few, first indicated, that the decreased lateral pressure resulting from the Bernoulli effect, exerted through a plurality of vents the duct is able to repeatedly clear itself; however, if the number of vents is too large, then the rate of venting in the early stages is sufficient to lower the velocity, allowing for an accumulation of solids and consequent plugging. By venting the air at a rate to cause the average velocity within the duct to remain substantially constant, the solids continue to pass through into subsequent processing.

It is, therefore an object of the present invention to provide apparatus for transition from a pneumatic conveyor to a feeder whereby the plugging of material flow is minimized.

It is a further object of the present invention to provide a pneumatic conveyor whereby the entrance of conveying air to processing apparatus is minimized.

It is still a further object of the present invention to provide apparatus for continuous pneumatic feeding of particulate materials to apparatus with maximum freedom of plugging and minimum introduction of conveying air into processing equipment.

Figure 2:
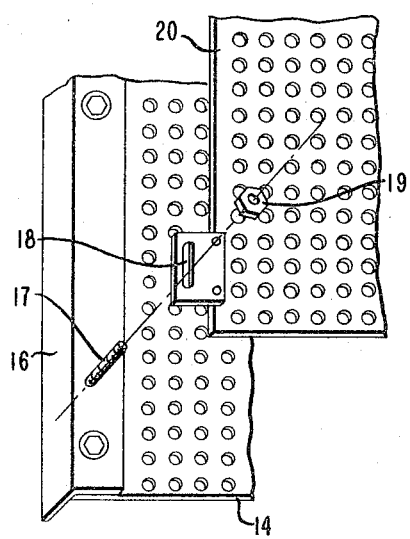

These and other important objects and advantages of the invention will become apparent as the same is more fully understood from the following description, which, taken in connection with the accompanying drawings, discloses preferred embodiments of the invention wherein:

FIGURE 1 is a perspective view of the tapered, perforated feeding duct of the present invention shown in conjunction with a conveying duct and screw; and FIGURE 2 shows one wall of the feeding duct shown in FIGURE 1 with an outer, adjustable sliding wall.

Illustrated in FIGURE 1, is section of pneumatic conveying duct 10, shown in outline, in which the present invention is employed as feeder 11 to process apparatus 12 shown as a motor-driven screw. Vertical, tapered duct 13 of reduced transverse cross-section has all four walls 14 of perforated sheet stock. Optionally, curved duct 15 also may have one or more walls perforated. The perforation, of course, must be of a size sufficiently small to prevent passage of the particulate material of the conveyed stream.

It is recognized that the entrained solids content of the conveyed stream may vary over a wide range such that the quantity of conveying air is preferably varied. Therefore, as illustrated in FIGURE 2, a second sheet of perforated metal 20 is positioned over the body of the feeding duct walls 14, with provision to slide the second perforated sheet wth respect to the perforated wall, so as to vary the register of the perforations and the extent of venting the conveying air. Shown in the drawing in exploded view are sections of duct 16, having stud 17 welded thereto, which engages slot 18 and is held in position by nut 19. Movement along slot 18 varies the venting aperture, and thus controls the extent of venting. Attention is given to maintaining a smooth face on the interior of the duct, not only on the walls, but also on the head of stud 17, which is ground and polished to avoid obstructing the free flow of solids.

To exemplify the invention, a feeder for polyethylene terephthalate film trim is coupled to a 12 x 24 inch duct. The feeder is tapered over a vertical distance of 44 inches, so that the dimension on the 12-inch sides is reduced to 5 inches. This tapered feeder is provided with perforation in the walls as described hereinbefore. The perforated walls are constructed of 10 gauge aluminum, with 1/8" diameter holes spaced on 3/16" staggered centers. This duct, as previously employed without venting plugged in less than 3–5 minutes, but after installing perforated walls, the stream operated continuously without plugging.

What is claimed is:
1. In apparatus for pneumatically conveying and feeding particulate matter by means of a fluid medium, said apparatus having a conveying section and a feeding sec- tion, the improvement comprising: a tapered duct intermediate said conveying section and said feeding section coupling said conveying section to said feeding section, said duct having (1) a reduction in transverse cross-section between said conveying section and said feeding section, (2) perforations, in at least part of its surface, dimension sufficient to prevent the passage of said particulate material, said perforations having an area substantially equal to the reduction in transverse cross-sectional area between said conveying section and said feeding section to vent a substantial portion of the conveying fluid medium for maintaining a substantially uniform velocity of said pneumatically conveyed particulate matter through said coupling duct.

2. The apparatus of claim 1 wherein the area of the perforations in any portion of the wall of said duct is substantially equal to the reduction in cross-sectional area of said duct.

3. The apparatus of claim 2 wherein a perforated sheet is slidably affixed over the perforations in said duct, said sheet adapted to vary the register of the perforations and the amount of conveying fluid medium through said perforations.

4. An article of manufacture adapted for pneumatically conveying particulate matter by means of a fluid medium between a pneumatic conveying conduit and a feed section comprising a tapered duct having a tapered perforated wall intermediate of and extending between a first end of said duct adapted for connection to said pneumatic conveying conduit and a second end thereof adapted for connection to said feed section of smaller cross-sectional area than said first end wherein the total area of the perforations in said tapered wall is substantially equal to the reduction in cross-sectional area between said first end and said second end of said duct adapted for venting a substantial portion of said fluid medium for maintaining a substantially uniform velocity of the particulate material conveyed pneumatically in said duct.

References Cited by the Examiner

UNITED STATES PATENTS

| | | | |
|---|---|---|---|
| 1,339,240 | 5/1920 | Travis | 302—59 |
| 1,775,911 | 9/1930 | Nagel et al. | 302—63 |
| 1,877,683 | 9/1932 | Mustonen | 320—59 |
| 2,917,344 | 12/1959 | Futty | 302—59 |

FOREIGN PATENTS

| | | |
|---|---|---|
| 1,279,168 | 11/1961 | France. |

ANDRES H. NIELSEN, *Primary Examiner.*